(12) United States Patent
Matsuda et al.

(10) Patent No.: US 9,365,110 B2
(45) Date of Patent: Jun. 14, 2016

(54) VEHICLE CONTROL APPARATUS FOR CONTROLLING THE DRIVE FORCE OF THE VEHICLE

(71) Applicant: Nissan Motor Co., Ltd., Yokohama-shi, Kanagawa (JP)

(72) Inventors: Takashi Matsuda, Isehara (JP); Shouta Hamane, Chigasaki (JP); Motoyuki Hattori, Atsugi (JP); Kouichi Mori, Ayase (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 677 days.

(21) Appl. No.: 13/795,440

(22) Filed: Mar. 12, 2013

(65) Prior Publication Data

US 2013/0245923 A1 Sep. 19, 2013

(30) Foreign Application Priority Data

Mar. 13, 2012 (JP) .................................. 2012-055211

(51) Int. Cl.
*B60K 23/00* (2006.01)
*B60W 10/06* (2006.01)
*B60W 10/101* (2012.01)
*B60W 30/18* (2012.01)

(52) U.S. Cl.
CPC ............... *B60K 23/00* (2013.01); *B60W 10/06* (2013.01); *B60W 10/101* (2013.01); *B60W 30/18072* (2013.01); *B60W 2030/1809* (2013.01); *B60W 2520/105* (2013.01); *B60W 2550/142* (2013.01); *Y02T 10/48* (2013.01)

(58) Field of Classification Search
CPC .... B60K 23/00; B60W 10/06; B60W 10/101; B60W 2030/1809; B60W 2520/105; B60W 2550/142; B60W 30/18072; B60W 30/181; B60W 30/18018; Y02T 10/48

USPC ................ 701/93, 94, 103, 104, 110, 112; 123/179.4, 198 DC; 73/1.37, 1.38, 73/114.05, 114.12, 503

See application file for complete search history.

(56) References Cited

U.S. PATENT DOCUMENTS

| | | | | |
|---|---|---|---|---|
| 6,411,881 B1* | 6/2002 | Thomas | ............... | B60T 7/122 180/69.6 |
| 8,380,405 B2* | 2/2013 | Matsuda | ............... | F02D 17/00 180/65.28 |
| 8,504,274 B2* | 8/2013 | Park | ............... | B60W 30/143 701/1 |
| 8,615,352 B2* | 12/2013 | Maruyama | ............... | B60W 30/17 701/93 |
| 8,706,366 B2* | 4/2014 | Kim | ............... | F02N 11/0814 123/179.4 |
| 9,045,130 B2* | 6/2015 | Sano | ............... | F02D 29/02 |
| 2001/0013701 A1* | 8/2001 | Onoyama | ............... | B60K 6/485 290/40 C |
| 2003/0004635 A1* | 1/2003 | Kamiya | ............... | B60K 41/202 701/112 |

(Continued)

FOREIGN PATENT DOCUMENTS

CN 102341287 A 2/2012
JP 60-070307 4/1985

(Continued)

*Primary Examiner* — Stephen K Cronin
*Assistant Examiner* — Carl Staubach
(74) *Attorney, Agent, or Firm* — Young Basile Hanlon & MacFarlane P.C.

(57) ABSTRACT

While a vehicle speed is between a first certain vehicle speed and a second certain vehicle speed lower than the first certain vehicle speed, it is determined whether to perform vehicle control in accordance with conditions excluding a condition based on the estimated road surface slope.

5 Claims, 3 Drawing Sheets

(56) References Cited

U.S. PATENT DOCUMENTS

| | | | |
|---|---|---|---|
| 2007/0173984 A1* | 7/2007 | Nakayama | B60T 7/12 701/1 |
| 2009/0138168 A1* | 5/2009 | Labuhn | B60W 10/10 701/93 |
| 2011/0320102 A1* | 12/2011 | Ohbayashi | B60K 31/047 701/93 |
| 2013/0116089 A1* | 5/2013 | Wegner | G05D 13/04 477/110 |
| 2013/0179053 A1* | 7/2013 | Matsunaga | B60W 10/02 701/112 |
| 2013/0238164 A1* | 9/2013 | Matsuda | B60W 40/076 701/1 |
| 2013/0252785 A1* | 9/2013 | Kinoshita | B60K 28/12 477/97 |
| 2013/0261931 A1* | 10/2013 | Hamane | F02D 29/02 701/102 |

FOREIGN PATENT DOCUMENTS

| | | |
|---|---|---|
| JP | 2005-119467 A | 5/2005 |
| JP | 2005-201107 A | 7/2005 |

* cited by examiner

VEHICLE CONTROL APPARATUS FOR CONTROLLING THE DRIVE FORCE OF THE VEHICLE

TECHNICAL FIELD

The present invention relates to a vehicle control apparatus.

BACKGROUND

Technologies for vehicle control apparatuses for automatically stopping an engine of a vehicle during deceleration before the vehicle completely stops in order to enhance fuel economy are available. In such technologies, the slope of a road surface on which the vehicle is travelling is estimated to determine whether or not to automatically stop the engine in order to prevent the vehicle from rolling down a hill.

One method for determining an estimated value of the slope of the road surface on which the vehicle is traveling is disclosed in Japanese Unexamined Patent Application Publication No. 60-70307. In the disclosed method, a forward/backward acceleration estimated based on a wheel speed of the vehicle, which is obtained from a wheel speed sensor, is subtracted from a forward/backward acceleration of the vehicle, which is detected by an acceleration sensor.

In the technologies of the related art, gear backlash or torsional oscillation caused by changes in torque due to the depression of a brake pedal, disengagement of a lock-up clutch, stopping of the engine caused by a fuel cut while the vehicle is traveling may result in deterioration of the precision for the estimation of road surface slope.

For this reason, an estimated value of road surface slope which varies over a slope on which automatic stopping of the engine is actually allowed may cause inappropriate performance and cancellation of performance of an operation, such as unnecessary restarting of the engine and control hunting in which the engine is repeatedly automatically stopped and restarted.

BRIEF SUMMARY

The present invention provides a vehicle control apparatus capable of suppressing or reducing inappropriate performance and cancellation of performance of vehicle control which are caused by incorrect estimation of road surface slope.

In an aspect of the present invention, while a vehicle speed is between a first certain vehicle speed and a second certain vehicle speed lower than the first certain vehicle speed, whether to perform vehicle control is determined in accordance with conditions excluding the condition based on the estimated road surface slope.

According to the present invention, therefore, inappropriate performance and cancellation of performance of vehicle control caused by incorrect estimation of road surface slope may be suppressed or reduced.

BRIEF DESCRIPTION OF THE DRAWINGS

The description herein makes reference to the accompanying drawings wherein like reference numerals refer to like parts throughout the several views, and wherein.

DETAILED DESCRIPTION

A vehicle control apparatus according to an embodiment of the present invention will be described hereinafter with reference to the drawings.

First, a configuration according to a first embodiment will be described.

Figure 1:
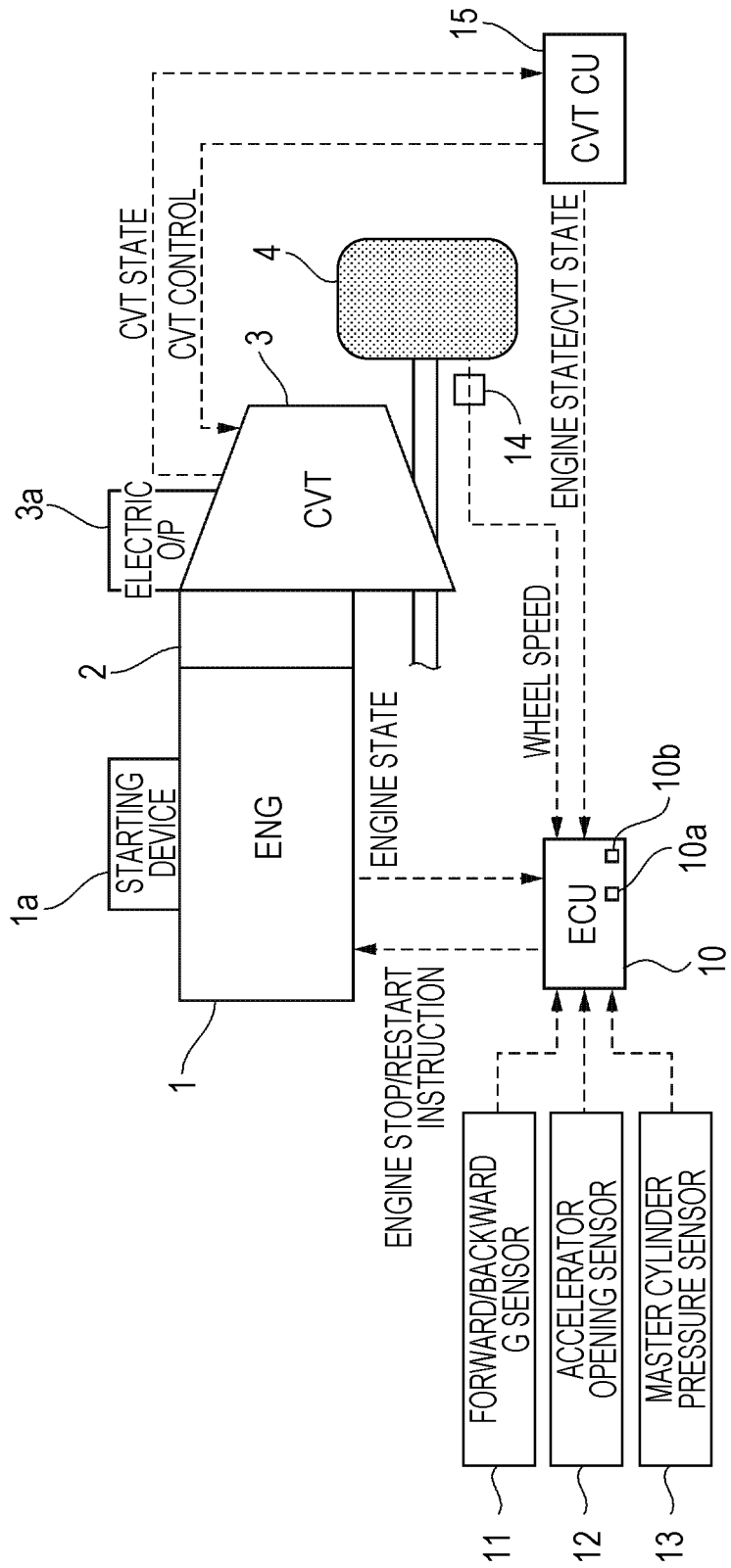
FIG. 1 is a system diagram illustrating a vehicle control apparatus according to a first embodiment.

FIG. 1 is a system diagram illustrating a vehicle control apparatus according to the first embodiment. A rotational drive force input from an engine 1 is input to a belt continuously variable transmission (CVT) 3 through a torque converter 2, and is transmitted to drive wheels 4 after the speed of the rotational drive force has been changed with a desired transmission gear ratio.

The engine 1 includes a starting device 1a that initiates an engine start process. Specifically, the engine 1 is equipped with a starter motor, with which engine cranking is performed in accordance with an engine start instruction and fuel is injected into the engine 1. When the engine 1 becomes rotating in a self-sustaining manner, the starter motor is stopped.

The torque converter 2 is provided on the output side of the engine 1. The torque converter 2 includes a lock-up clutch to amplify the torque at parking speeds and to prohibit relative rotation at speeds greater than or equal to a certain vehicle speed (for example, appropriately 14 km/h). The belt CVT 3 is connected to the output side of the torque converter 2.

The belt CVT 3 includes a start clutch, a primary pulley, a secondary pulley, and a belt stretched across the pulleys, and the groove widths of the pulleys are changed by hydraulic control to achieve a desired transmission gear ratio. The belt CVT 3 further includes an oil pump driven by the engine 1. When the engine 1 is activated, a converter pressure and lock-up clutch pressure of the torque converter 2 are supplied from the oil pump serving as a hydraulic pressure source, and a pulley pressure and clutch engagement pressure of the belt CVT 3 are further supplied.

The belt CVT 3 further includes an electric oil pump 3a. When it is difficult to supply a hydraulic pressure using the oil pump because the engine 1 has been automatically stopped, the electric oil pump 3a is activated to enable necessary hydraulic pressures to be supplied to the individual actuators. Thus, even while the engine 1 is not running, the desired transmission gear ratio may be achieved, and the clutch engagement pressure may be maintained.

The operation state of the engine 1 is controlled by an engine control unit (vehicle control means) 10. The engine control unit 10 receives a forward/backward G signal input from a forward/backward G sensor (acceleration detecting means) 11 that detects the forward/backward acceleration of the vehicle, an accelerator signal input from an accelerator opening sensor 12 that detects the amount of accelerator pedal (or gas pedal) operation by a driver who drives the vehicle, a braking operation amount signal (master cylinder pressure) input from a master cylinder pressure sensor 13 that detects a master cylinder pressure generated in accordance with the amount of braking operation, wheel speed signals input from wheel speed sensors 14 provided on the individual wheels, a CVT state signal input from a CVT control unit 15 described below, and signals indicating an engine coolant temperature, a crank angle, an engine rotational speed, and so forth. The engine control unit 10 causes the engine 1 to start or automatically stop in accordance with the various signals described above. The master cylinder pressure sensor 13 may be replaced by a pedal force sensor that detects the brake pedal stroke amount or the brake pedal force, a sensor that detects the wheel cylinder pressure, or the like to detect the amount of operation of the brake pedal.

The CVT control unit 15 transmits and receives the signals of the engine operation state and CVT state to and from the engine control unit 10, and controls the transmission gear ratio and the like of the belt CVT 3 in accordance with the signals. Specifically, when the driving range is selected, the CVT control unit 15 engages the start clutch, determines a transmission gear ratio from a transmission gear ratio map in accordance with the accelerator pedal opening and the vehicle speed, and controls the individual pulley hydraulic pressures. Further, the CVT control unit 15 disengages the lock-up clutch when the vehicle speed is less than a certain vehicle speed, and engages the lock-up clutch to directly connect the engine 1 and the belt CVT 3 when the vehicle speed is greater than or equal to the certain vehicle speed. In addition, while the driving range is selected and the engine 1 is automatically stopped, the CVT control unit 15 causes the electric oil pump 3a to operate to reserve the necessary hydraulic pressure.

In the first embodiment, when the vehicle is decelerating even during traveling and presumably will stop, coast stop control for stopping the engine 1 is performed.

The coast stop control is initiated when all the following five conditions are met, and is terminated when any one of the following five conditions is not met:

(1) The amount of braking operation is greater than or equal to a certain amount (braking condition).

(2) The amount of accelerator pedal operation is zero (accelerator condition).

(3) The driving range is selected (range position condition).

(4) The vehicle speed is less than or equal to a reference vehicle speed (vehicle speed at which the lock-up clutch is disengaged) (vehicle speed condition).

(5) The road surface slope is less than or equal to a slope threshold (certain degree of slope) (slope condition).

The engine control unit 10 includes a forward/backward G estimator (acceleration detecting means) 10a that estimates the forward/backward G, or G force, of the vehicle, and a road surface slope estimator (road surface slope estimating means) 10b configured to detect a road surface slope and rough terrain.

The forward/backward G estimator 10a receives the forward/backward G (detected forward/backward G) detected by the forward/backward G sensor 11 and the wheel speeds detected by the individual wheel speed sensors 14, calculates a vehicle speed from the wheel speeds, and differentiates the vehicle speed to determine an estimated value of the forward/backward acceleration (estimated forward/backward G).

The road surface slope estimator 10b subtracts the estimated forward/backward G from the detected forward/backward G, and outputs the resulting calculated value as an estimated road surface slope value.

Figure 2:
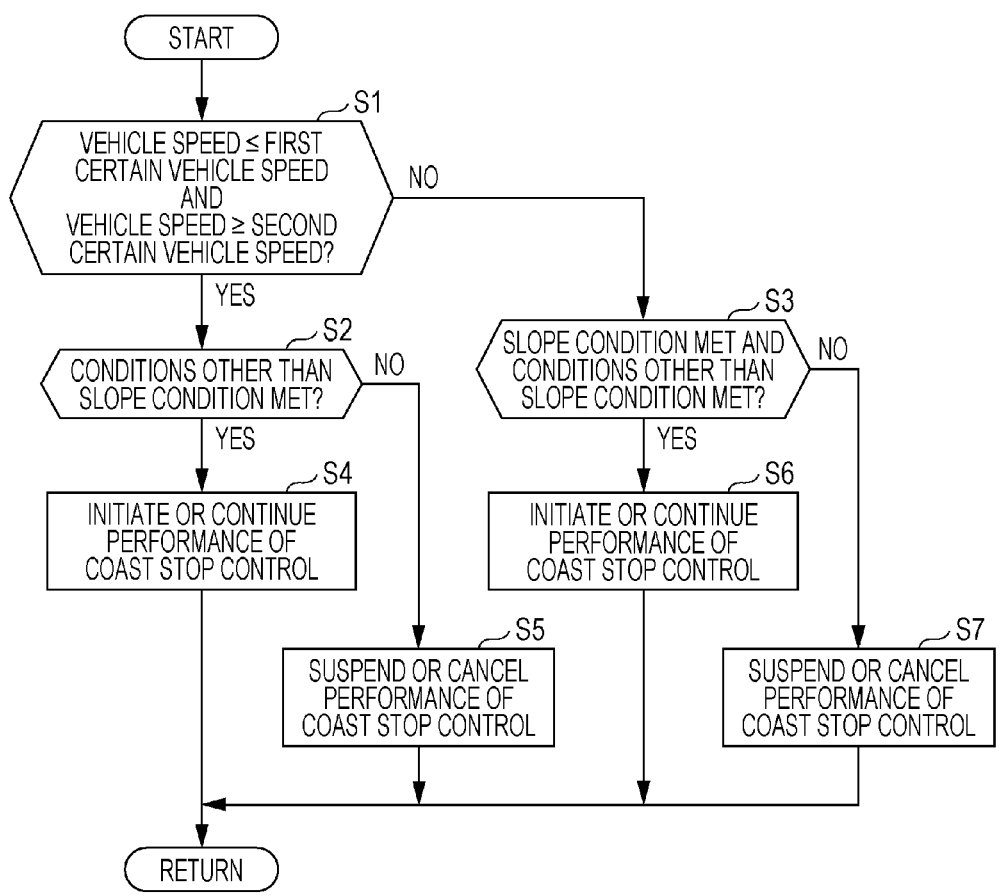
FIG. 2 is a flowchart illustrating a procedure of a process for determining whether to perform coast stop control, which is executed by an engine control unit according to the first embodiment.

FIG. 2 is a flowchart illustrating a procedure of a process for determining whether to perform coast stop control, which is executed by the engine control unit 10 according to the first embodiment. Individual steps will be described.

In step S1, it is determined whether or not the vehicle speed calculated by the forward/backward G estimator 10a is less than or equal to a first certain vehicle speed and is greater than or equal to a second certain vehicle speed (where the second certain vehicle speed is lower than the first certain vehicle speed). If "YES" is determined, the process proceeds to step S2 whereas if "NO" is determined, the process proceeds to step S3.

The first certain vehicle speed is in a vehicle speed region where the vehicle will not roll down a hill if the engine 1 is automatically stopped, and is set using a time period required for the vehicle speed to reduce to the second certain vehicle speed from the first certain vehicle speed, the deceleration of the vehicle estimated when the coast stop control is not performed during the time period, and the second certain vehicle speed.

The second certain vehicle speed is the upper limit of a low-vehicle-speed region where the vehicle will roll down a hill if the engine 1 is automatically stopped.

In step S2, it is determined whether or not all the conditions, except the slope condition, among the coast stop initiation conditions (1) to (5), namely, the braking condition, the accelerator condition, the range position condition, and the vehicle speed condition, are met. If "YES" is determined, the process proceeds to step S4 whereas if "NO" is determined, the process proceeds to step S5.

In step S3, it is determined whether or not all the coast stop initiation conditions (1) to (5) are met. If "YES" is determined, the process proceeds to step S6 whereas if "NO" is determined, the process proceeds to step S7.

In step S4, the coast stop control is performed. If the coast stop control is currently being performed, the performance of the coast stop control is continued.

In step S5, the coast stop control is not performed. If the coast stop control is currently being performed, the performance of the coast stop control is suspended or canceled.

In step S6, the coast stop control is performed. If the coast stop control is currently being performed, the performance of the coast stop control is continued.

In step S7, the coast stop control is not performed. If the coast stop control is currently being performed, the performance of the coast stop control is suspended or canceled. Next, the operation will be described.

Figure 3:
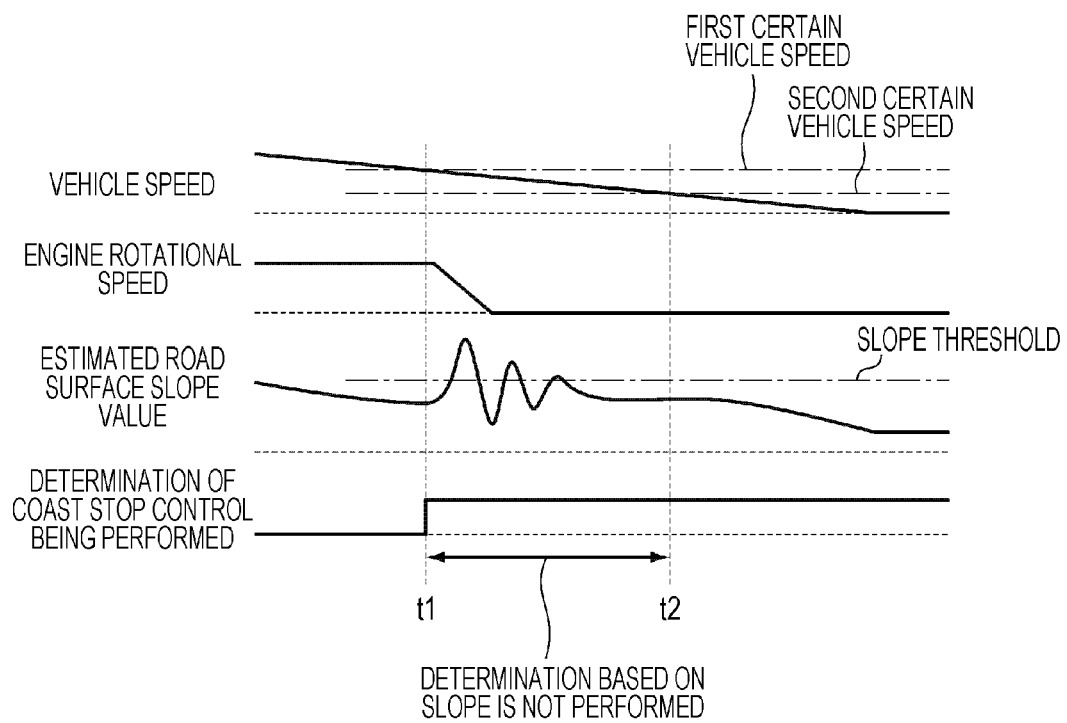
FIG. 3 is a time chart illustrating the operation of determining whether to perform coast stop control according to the first embodiment.

FIG. 3 is a time chart illustrating the operation of determining whether to perform coast stop control according to the first embodiment.

In a period prior to time t1, the vehicle speed is higher than the first certain vehicle speed. Thus, in the flowchart illustrated in FIG. 2, the process proceeds from step S1 to step S3, in which it is determined whether or not to perform coast stop control in accordance with all the initiation conditions including the slope condition. In the case illustrated in FIG. 3, the vehicle speed condition is not met. Thus, the process proceeds to step S7, in which the coast stop control is not performed.

At time t1, the vehicle speed becomes less than or equal to the first certain vehicle speed. Thus, in the flowchart illustrated in FIG. 2, the process proceeds from step S1 to step S2. In step S2, it is determined whether or not to perform coast stop control in accordance with the conditions excluding the slope condition from the coast stop initiation conditions. In the case illustrated in FIG. 3, all the conditions (1) to (4) are met. Thus, the process proceeds to step S4, in which the coast stop control is performed and the engine 1 is automatically stopped.

In a period from time t1 to time t2, due to the reduction in engine torque caused by the engine 1 coming to a stop, the values detected by the forward/backward G sensor 11 and the wheel speed sensor 14 vary. Thus, the estimated road surface slope value calculated based on the detected values also varies. In the first embodiment, it is determined whether or not to perform coast stop control in accordance with the conditions excluding the slope condition. Since determination based on the slope condition is not performed, influences caused by incorrect estimation of an estimated road surface slope value, that is, unnecessary restarting of the engine 1 because of the variation in an estimated road surface slope value over a slope threshold and control hunting in which the engine 1 is repeatedly automatically stopped and restarted, may be prevented or at least reduced.

At time t2, the vehicle speed becomes less than the second certain vehicle speed. Thus, in the flowchart illustrated in FIG. 2, the process proceeds from step S1 to step S3. In step S3, it is determined whether or not to perform coast stop control in accordance with all the initiation conditions including the slope condition. In the case illustrated in FIG. 3, all the conditions are met. Thus, the process proceeds to step S6, in which the coast stop control is continued.

In most of the vehicle control to enhance fuel economy, such as coast stop control, the engine output is reduced to suppress or reduce fuel consumption. Such vehicle control results in a reduction in engine torque, and therefore is not generally performed for, particularly, a hill with a large road surface slope in order to prevent the vehicle from rolling down the hill.

On the other hand, in the case where the vehicle speed is sufficiently high so as not to cause any concern regarding the possibility of the vehicle rolling down a hill even if the engine torque is reduced, high precision is not required for the estimation of road surface slope.

In the first embodiment, therefore, the second certain vehicle speed is set to the upper limit of a low-vehicle-speed region where the vehicle will roll down a hill if the engine 1 is automatically stopped.

This may prevent, or at least reduce, the vehicle from rolling down a hill in a low-vehicle-speed region which requires high precision for the estimation of road surface slope, by determining whether to perform coast stop control in accordance with an estimated road surface slope, and may prevent, or at least reduce, unnecessary cancellation of the coast stop control or the occurrence of control hunting in a vehicle speed region which does not require high precision for the estimation of road surface slope.

In control for stopping the engine, such as coast stop control, initiation of the control may cause a reduction in the precision for the estimation of road surface slope. Since the engine torque is reduced to zero when the control is initiated, such a change in torque may cause gear backlash or torsional oscillation to have an effect on the values detected by the acceleration sensor and the wheel speed sensor.

Therefore, there is a need not to reduce the vehicle speed to the vehicle speed region less than or equal to the second certain vehicle speed when the precision for the estimation of road surface slope is low.

In the first embodiment, therefore, the first certain vehicle speed is set to be in a vehicle speed region where the vehicle will not roll down a hill if the engine 1 is automatically stopped, and is set using a time period required for the vehicle speed to reduce to the second certain vehicle speed from the first certain vehicle speed, the deceleration of the vehicle estimated when the coast stop control is not performed during the time period, and the second certain vehicle speed.

By setting the first certain vehicle speed in the manner described above and setting the vehicle speed at the initiation of the coast stop control to be in the vicinity of the first certain vehicle speed, it may be possible to prevent unnecessary cancellation of the coast stop control which is caused by a reduction in the precision for the estimation of road surface slope after the coast stop control is performed.

This concept may be applied to the case of stopping of the engine as well as all the operations which lead to a reduction in the precision for the estimation of road surface slope, such as the disengagement and engagement of the lock-up clutch.

The first embodiment may achieve the following advantages:

(1) A vehicle control apparatus includes a forward/backward G sensor 11 that outputs a detected forward/backward G of a vehicle, a forward/backward G estimator 10*a* that calculates an estimated forward/backward G of the vehicle, a road surface slope estimator 10*b* that calculates an estimated road surface slope using the detected forward/backward G and the estimated forward/backward G, and an engine control unit 10 that performs coast stop control to automatically stop the engine 1 when certain initiation conditions (braking condition, accelerator condition, range position condition, vehicle speed condition, slope condition) including a condition based on the estimated road surface slope are met, and the engine control unit 10 determines whether or not to perform the coast stop control while a vehicle speed is between a first certain vehicle speed and a second certain vehicle speed lower than the first certain vehicle speed, in accordance with the conditions excluding the slope condition (the braking condition, the accelerator condition, the range position condition, the vehicle speed condition). Therefore, unnecessary cancellation of the coast stop control which is caused by incorrect estimation of road surface slope and the occurrence of control hunting may be prevented or at least reduced.

(2) The second certain vehicle speed is set to the upper limit of a low-vehicle-speed region where the vehicle will roll down a hill if the coast stop control is performed. This may prevent, or at least reduce, the vehicle from rolling down a hill in a low-vehicle-speed region which requires high precision for the estimation of road surface slope, by determining whether to perform coast stop control based on an estimated road surface slope, and may prevent, or at least reduce, unnecessary cancellation of the coast stop control or the occurrence of control hunting in a vehicle speed region which does not require high precision for the estimation of road surface slope.

(3) The first certain vehicle speed is set to a value in a vehicle speed region where the vehicle will not roll down a hill if the coast stop control is performed. This may prevent, or at least reduce, the vehicle from rolling down a hill even if it is determined whether to perform the coast stop control in accordance with the conditions excluding the slope condition (the braking condition, the accelerator condition, the range position condition, the vehicle speed condition).

(4) The first certain vehicle speed is set using a time period required for the vehicle speed to reduce to the second certain vehicle speed from the first certain vehicle speed, the deceleration of the vehicle estimated when the coast stop control is not performed during the time period, and the second certain vehicle speed. This may prevent, or at least reduce, unnecessary cancellation of the coast stop control which is caused by a reduction in the precision for the estimation of road surface slope after the coast stop control is performed.

Other Embodiments

While an apparatus for controlling automatic stopping and restarting of an engine according to some embodiments of the present invention has been described, the present invention is not limited to the foregoing configuration and any other configuration may be used without departing from the scope of the present invention.

The coast stop control initiation conditions are not limited to the five conditions described in the foregoing embodiment as long as the slope condition is included.

The present invention may be applied to coast stop control as well as vehicle control to reduce the drive force of the vehicle when certain conditions including a condition based on an estimated road surface slope are met, and may achieve advantages similar to those described in the foregoing embodiment.

What is claimed is:

1. A vehicle control apparatus comprising:
an acceleration detecting unit configured to detect a forward/backward acceleration of a vehicle;
a road surface slope estimating unit configured to estimate a road surface slope based on the detected forward/backward acceleration; and
a vehicle control unit configured to perform vehicle control to reduce a drive force of the vehicle during a vehicle running condition where a vehicle speed is greater than zero, when certain conditions are met, the certain conditions including a condition based on the estimated road surface slope, wherein the vehicle control unit determines whether or not to perform the vehicle control while the vehicle speed is between a first vehicle speed and a second vehicle speed that is lower than the first vehicle speed based on conditions, wherein the conditions exclude the certain condition based on the estimated road surface slope.

2. The vehicle control apparatus according to claim 1, wherein the second vehicle speed is set in a low-vehicle-speed region where the vehicle will roll down a slope if the vehicle control is performed.

3. The vehicle control apparatus according to claim 1, wherein the first vehicle speed is set in a vehicle speed region where the vehicle will not roll down a slope if the vehicle control is performed.

4. The vehicle control apparatus according to claim 1, wherein the first vehicle speed is set using a time period required for a speed of the vehicle to reduce to the second vehicle speed from the first vehicle speed, deceleration of the vehicle estimated when the vehicle control is not performed during the time period, and the second vehicle speed.

5. A vehicle control apparatus comprising:
means for detecting a forward/backward acceleration of a vehicle;
means for estimating a road surface slope based on the detected forward/backward acceleration; and
means for performing vehicle control to reduce a drive force of the vehicle during a vehicle running condition where a vehicle speed is greater than zero, when certain conditions are met, the certain conditions including a condition based on the estimated road surface slope are met, wherein the means for performing vehicle control determines whether or not to perform the vehicle control while the vehicle speed is between a first vehicle speed and a second vehicle speed lower than the first vehicle speed based on certain conditions, wherein the certain conditions exclude the condition based on the estimated road surface slope.

* * * * *